United States Patent
Nakayama

(10) Patent No.: US 10,870,227 B2
(45) Date of Patent: Dec. 22, 2020

(54) MANUFACTURING APPARATUS FOR ROBOT ARM

(71) Applicant: FANUC CORPORATION, Yamanashi (JP)

(72) Inventor: Kazutaka Nakayama, Yamanashi (JP)

(73) Assignee: FANUC CORPORATION, Yamanashi (JP)

(*) Notice: Subject to any disclaimer, the term of this patent is extended or adjusted under 35 U.S.C. 154(b) by 0 days.

(21) Appl. No.: 16/591,860

(22) Filed: Oct. 3, 2019

(65) Prior Publication Data

US 2020/0171720 A1    Jun. 4, 2020

(30) Foreign Application Priority Data

Nov. 29, 2018   (JP) .................... 2018-223867

(51) Int. Cl.
  *B29C 45/14* (2006.01)
  *B22D 19/00* (2006.01)
  *B25J 18/00* (2006.01)

(52) U.S. Cl.
  CPC ........ *B29C 45/14065* (2013.01); *B22D 19/00* (2013.01); *B25J 18/00* (2013.01); *B29C 45/14336* (2013.01); *B29C 45/14598* (2013.01)

(58) Field of Classification Search
  CPC .......................... B29C 45/14065; B22D 19/00
  See application file for complete search history.

(56) References Cited

U.S. PATENT DOCUMENTS

| | | | |
|---|---|---|---|
| 6,224,362 B1 | 5/2001 | Morita et al. | |
| 6,325,613 B1 | 12/2001 | Morita et al. | |
| 7,910,034 B2 * | 3/2011 | Dettinger | B29C 48/3001 264/251 |
| 2008/0260884 A1 | 10/2008 | Dannebey et al. | |
| 2011/0068619 A1 * | 3/2011 | Werner | B60G 11/183 301/127 |
| 2018/0290293 A1 * | 10/2018 | Nakayama | B25J 9/0024 |
| 2020/0030964 A1 * | 1/2020 | Nakayama | B25J 9/02 |

FOREIGN PATENT DOCUMENTS

| | | | |
|---|---|---|---|
| EP | 0 861 712 A2 | 9/1998 | |
| EP | 1 331 073 A2 | 7/2003 | |
| JP | 58128828 A * | 8/1983 | ....... B29C 45/14336 |
| JP | S60-150980 A | 8/1985 | |
| JP | H08-057791 A | 3/1996 | |
| JP | H10-233077 A | 9/1998 | |
| JP | 2008-534323 A | 8/2008 | |
| JP | 2013-018058 A | 1/2013 | |

* cited by examiner

*Primary Examiner* — Robert B Davis
(74) *Attorney, Agent, or Firm* — Maier & Maier, PLLC

(57) ABSTRACT

A manufacturing apparatus includes an arm main body with a long tubular or columnar shape having a uniform lateral cross-section, and attachment interface parts fixed to both sides of the arm main body and attached to another member. The apparatus includes: a pair of fixing parts supporting a part of each of the attachment interface parts and each end of the arm main body and each including a material filling space at least near a joint part between each of the attachment interface parts and the arm main body; a slide mechanism capable of adjusting a distance between the two fixing parts along a longitudinal axis of the arm main body by moving at least one of the fixing parts; and a material injection part injecting a molten material into the space so as to joint each of the attachment interface parts to each end of the arm main body.

5 Claims, 13 Drawing Sheets

MANUFACTURING APPARATUS FOR ROBOT ARM

CROSS-REFERENCE TO RELATED APPLICATIONS

This application claims the benefit of Japanese Patent Application No. 2018-223867, the content of which is incorporated herein by reference.

FIELD

The present invention relates to a manufacturing apparatus for a robot arm.

BACKGROUND

Arms of industrial robots are generally formed by casting metal such as aluminum alloy in order to keep strength while reducing the weight (for example, Japanese Unexamined Patent Application, Publication No. 2013-018058).

SUMMARY

One aspect of the present invention is a manufacturing apparatus for a robot arm including an arm main body with a long tubular or columnar shape having a uniform lateral cross-section, and attachment interface parts that are fixed to both sides of the arm main body and are attached to another member, the manufacturing apparatus including: a pair of fixing parts supporting at least a part of each of the attachment interface parts and each end of the arm main body in a positioned state and each including a material filling space at least near a joint part between each of the attachment interface parts and the arm main body; a slide mechanism capable of adjusting a distance between the two fixing parts along a longitudinal axis of the arm main body by moving at least one of the fixing parts; and a material injection part that injects a molten material into the material filling space so as to joint each of the attachment interface parts to each end of the arm main body.

Another aspect of the present invention is a manufacturing apparatus for a robot arm including an arm main body with a long tubular or columnar shape having a uniform lateral cross-section, and attachment interface parts that are fixed to both sides of the arm main body and are attached to another member, the manufacturing apparatus including: a pair of fixing parts each including a material filling space for molding each of the attachment interface parts and capable of supporting each end of the arm main body in a positioned state at a position of blocking the material filling space; a slide mechanism capable of adjusting a distance between the two fixing parts by moving at least one of the fixing parts; and a material injection part that injects a molten material into the material filling space so as to mold each of the attachment interface parts and joint each end of the arm main body to each of the molded attachment interface parts.

DETAILED DESCRIPTION

A manufacturing apparatus 100 for a robot arm 1 according to one embodiment of the present invention is described below with reference to the drawings.

Figure 1:
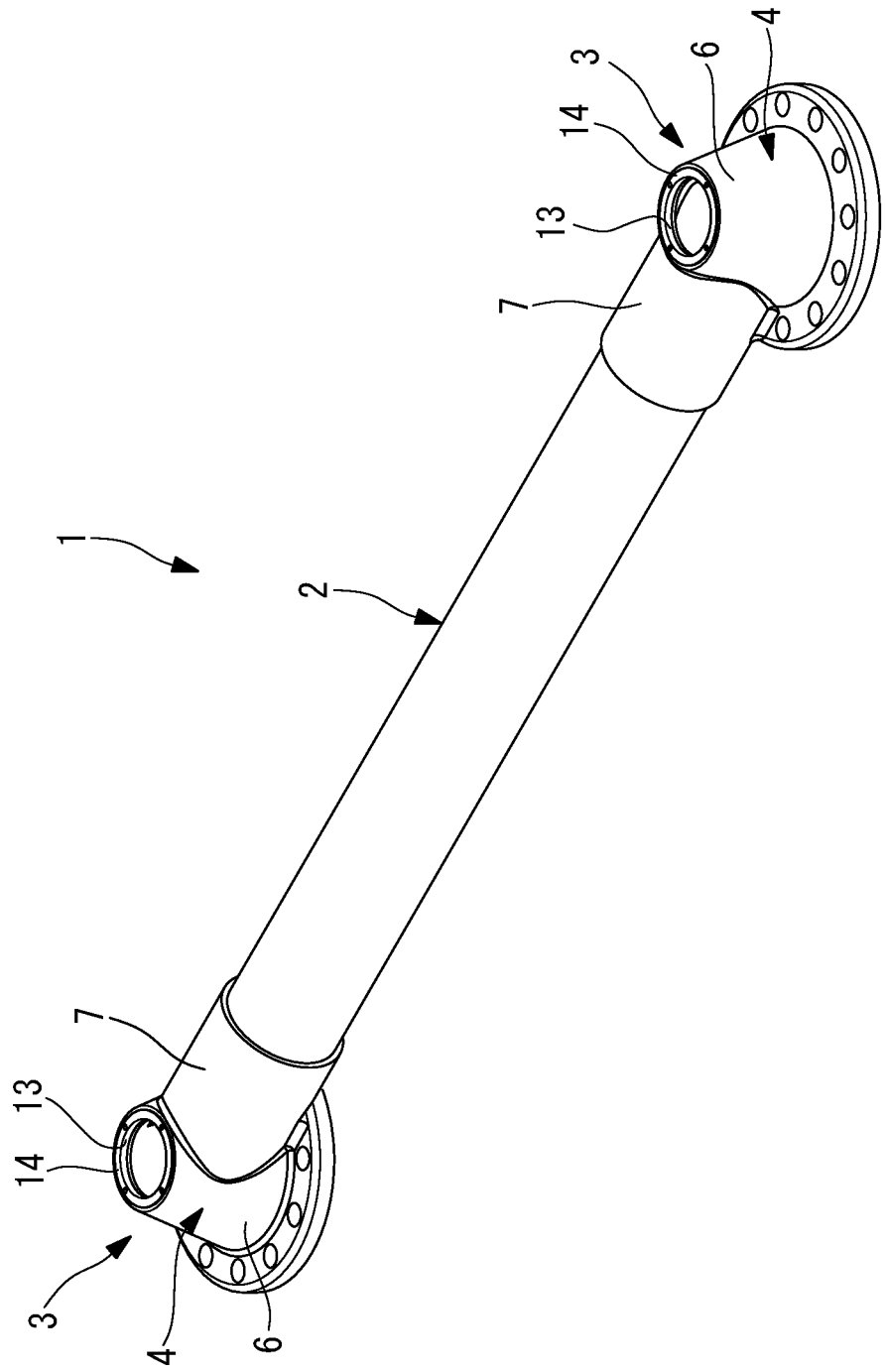
FIG. 1 is a perspective view illustrating one example of a robot arm that is manufactured by a manufacturing apparatus according to one embodiment of the present invention.

The robot arm 1 that is manufactured using the manufacturing apparatus 100 according to the present embodiment includes, as illustrated in FIG. 1, an arm main body 2 that has a long cylindrical shape having a uniform lateral cross-section, and attachment interface parts 3 each being fixed to each side of the arm main body 2 and attached to another member.

The arm main body 2 is formed of resin.

Figure 2:
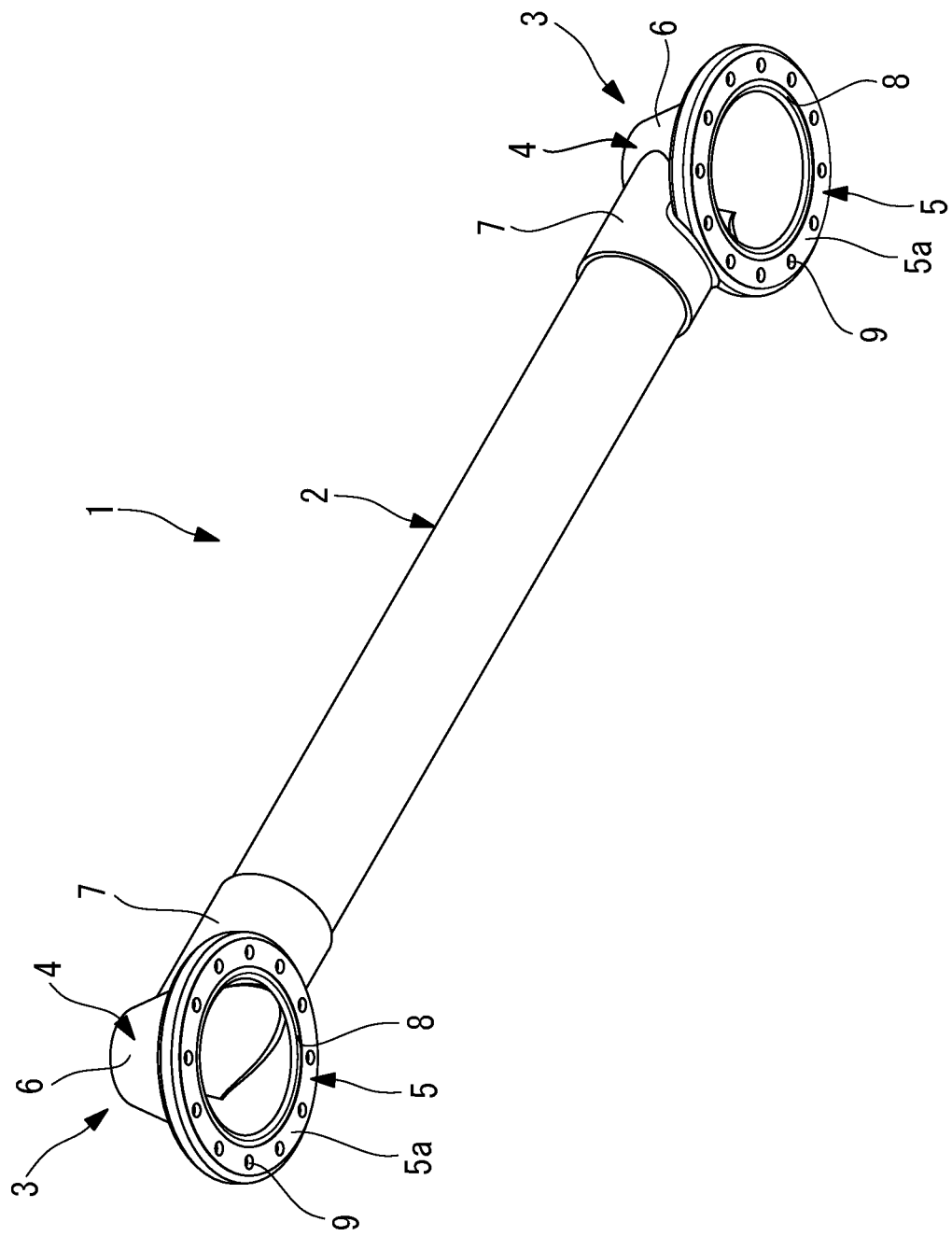
FIG. 2 is a perspective view illustrating the robot arm of FIG. 1 that is viewed from an attachment surface side.

The attachment interface part 3 includes, as illustrated in FIG. 1 and FIG. 2, a connection part 4 formed of resin that is connected to the arm main body 2, and a metal plate 5 with a flat plate shape that is embedded in the resin of the connection part 4. The connection parts 4 are disposed at both ends to block inner holes 2a of the arm main body 2, and each include a connection part main body 6 with an approximately truncated conical shape extended along an axial line that is orthogonal to a longitudinal axis of the arm main body 2, and a joint part 7 that is extended from an outer peripheral surface of the connection part main body 6 in a direction orthogonal to an axial line of the connection part main body 6 and is jointed to an end of the arm main body 2.

The metal plate 5 is placed in parallel to the longitudinal axis of the arm main body 2 in an area corresponding to a bottom surface of the connection part main body 6, and is embedded to the resin of the connection part 4 by, for example, insert molding.

Figure 3:
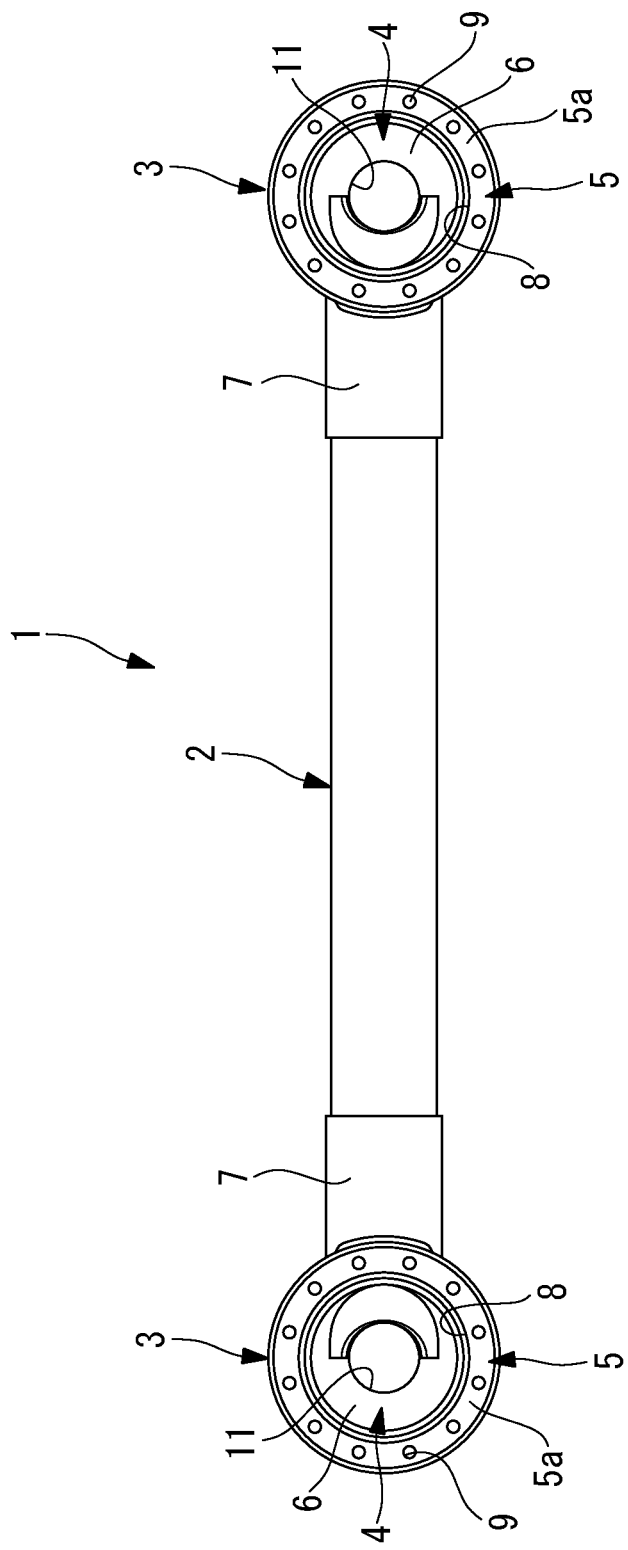
FIG. 3 is a diagram illustrating the robot arm of FIG. 1 that is viewed from the attachment surface side.

The metal plate 5 is formed to have a ring-plate shape with a central hole 8 as illustrated in FIG. 2 and FIG. 3. The metal plate 5 has a plurality of penetration holes 9 penetrating in a plate thickness direction at intervals in a circumferential direction.

Figure 6:
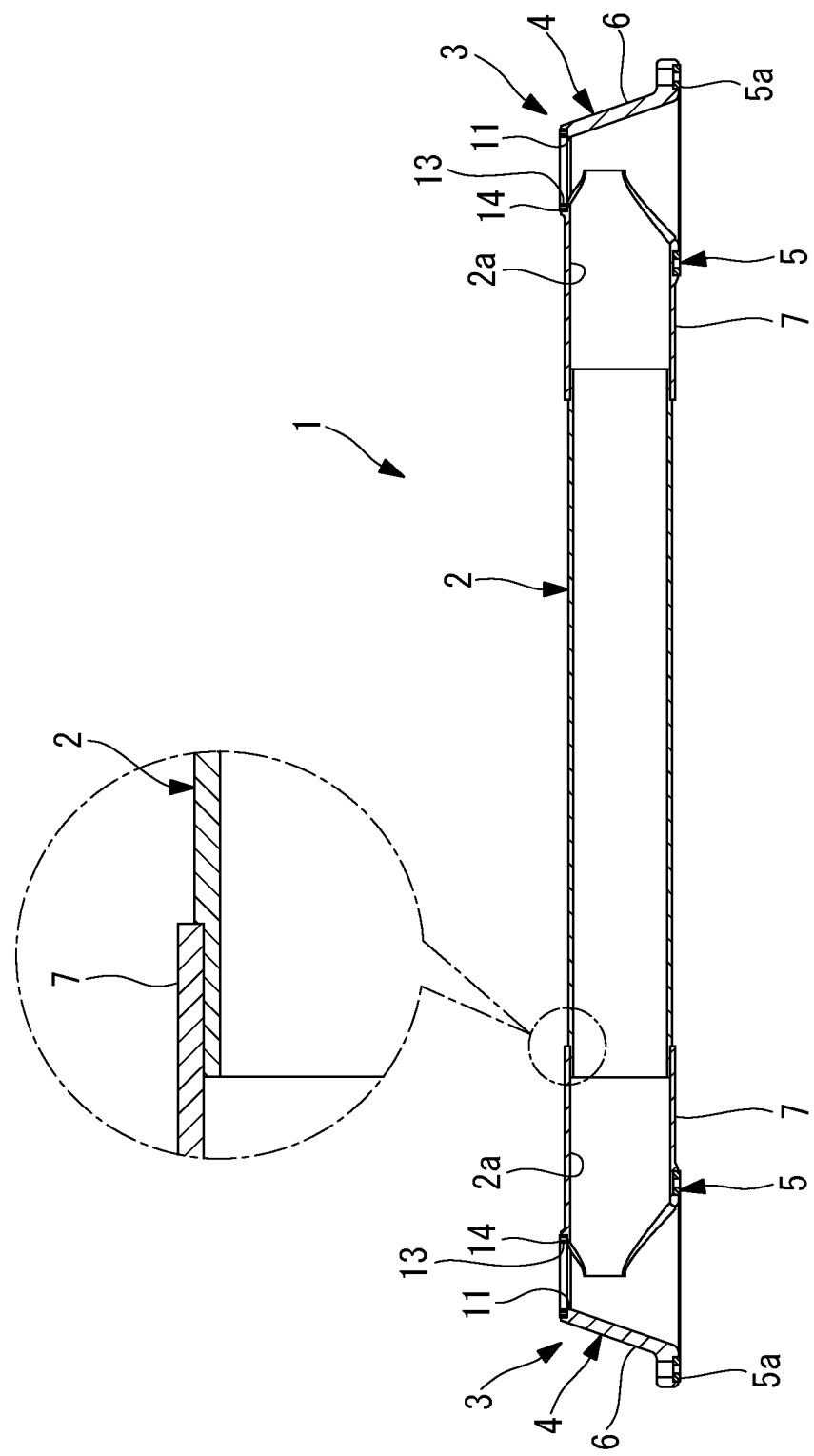
FIG. 6 is a longitudinal cross-sectional view illustrating the robot arm of FIG. 1.
Figure 7:
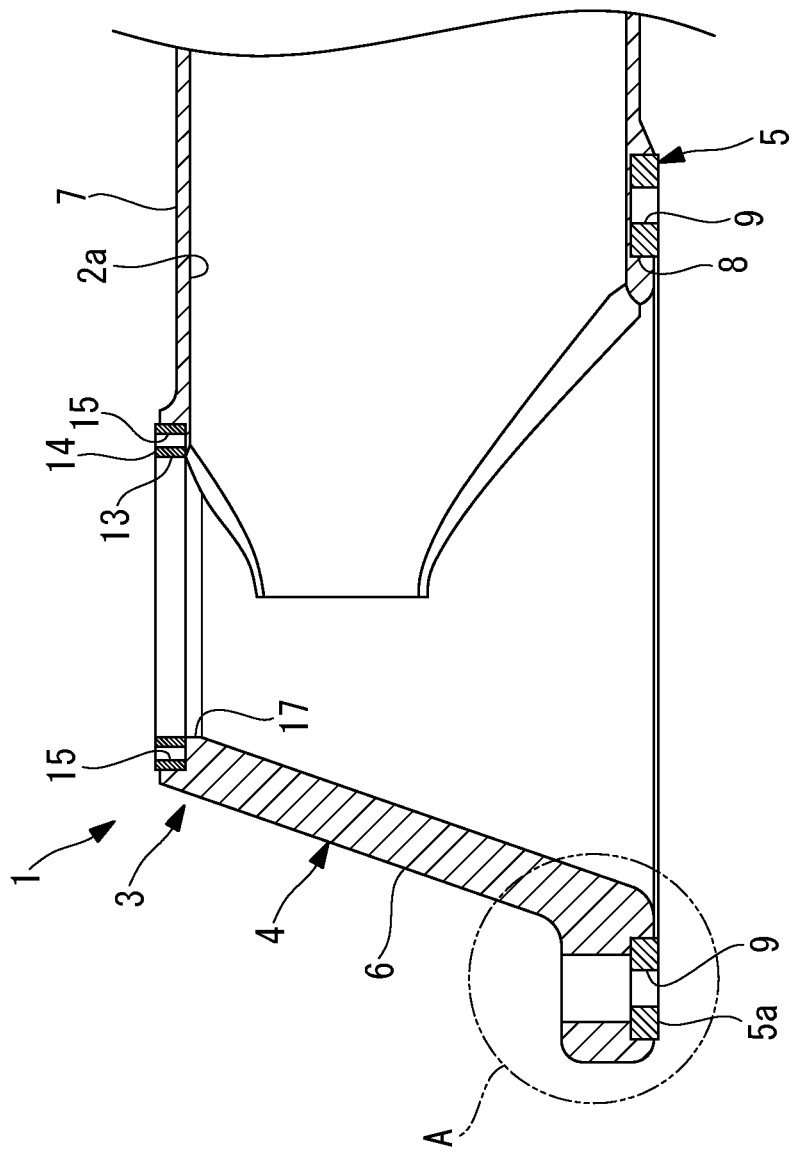
FIG. 7 is a magnified longitudinal cross-sectional view illustrating a part of an attachment interface part of the robot arm of FIG. 1.

As illustrated in FIG. 6 and FIG. 7, each connection part is formed to be hollow, and in an inner hole of the connection part 4, the joint part 7 formed to be hollow by the resin (molten material) injected to the side wall of the connection part 4 by a material injection part 130 is connected to the inner hole 2a of the arm main body 2. Thus, the inner hole 2a of the arm main body 2 is bent within the connection part 4 and opens to the central hole 8 of the each of two metal plates 5.

The metal plate 5 includes one surface in the plate thickness direction serving as an attachment surface 5a. The attachment surface 5a is exposed entirely.

Figure 4:
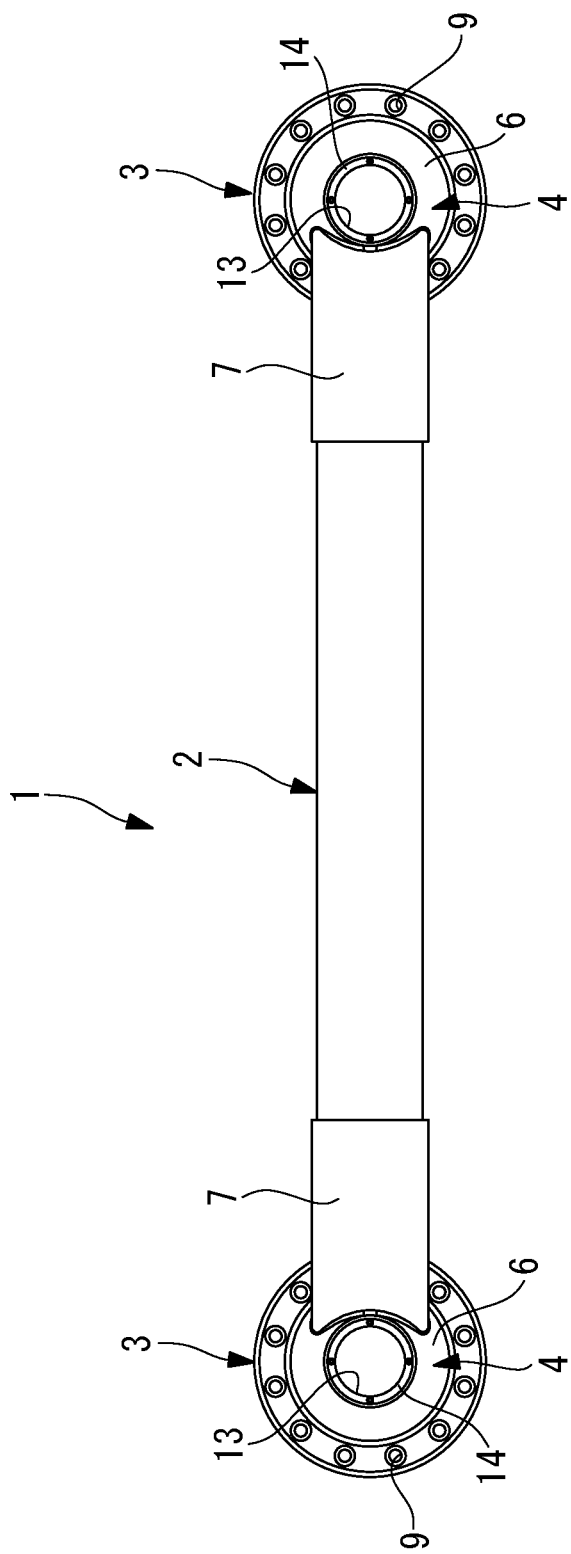
FIG. 4 is a plan view illustrating the robot arm of FIG. 1.

In addition, the other surface of the metal plate 5 in the plate thickness direction is covered with the resin of the connection part 4 with the periphery of some penetration holes 9 exposed partially as illustrated in FIG. 4. The surface of the metal plate 5 that is exposed to the periphery of the penetration holes 9 is exposed a little larger than the outer diameter of a head part of an attachment screw (see FIG. 10) 10, and functions as a seat surface of the attachment screw 10 inserted into the penetration hole 9.

The penetration hole 9 disposed at the position overlapping with the arm main body 2 is blocked by being covered with the resin of the connection part 4 without exposing the metal plate 5 as the seat surface. By such a structure, a positioning pin that is set will not be removed due to the motion of a robot 200, for example.

Figure 5:
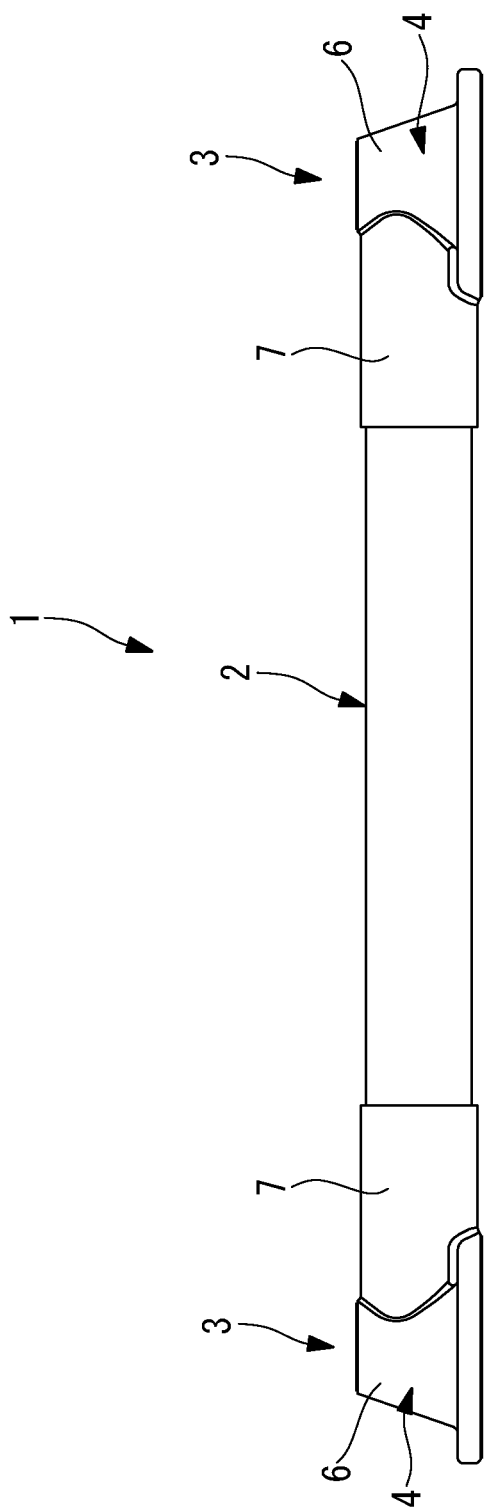
FIG. 5 is a side view illustrating the robot arm of FIG. 1.

The attachment surface 5a of the metal plate 5 is disposed so as to project from the resin of the connection part 4. The attachment surfaces 5a of the metal plates 5 of the two connection parts 4 are disposed on the same plane as illustrated in FIG. 5.

The connection part 4 includes an opening 11 that opens the space in the connection part 4 to the outside in a part different from the central hole 8 of the metal plate 5. In FIG. 1, the opening 11 is provided on a side opposite to the central hole 8; however, the opening 11 is not limited to this position and may be provided at a side surface of each connection part 4. The opening 11 can be blocked by a lid member (see FIG. 10) 12.

In a case where the lid member 12 that blocks the opening is fixed to the connection part 4 by a screw, as illustrated in FIG. 7, a metal plate 14, which is formed to have a ring-plate shape with a central hole 13 communicating with the opening 11, is embedded to the connection part 4 side by insert molding, and by opening a screw hole 15 in the metal plate 14, the lid member 12 can be fixed so as not to allow loosening.

Figure 8:
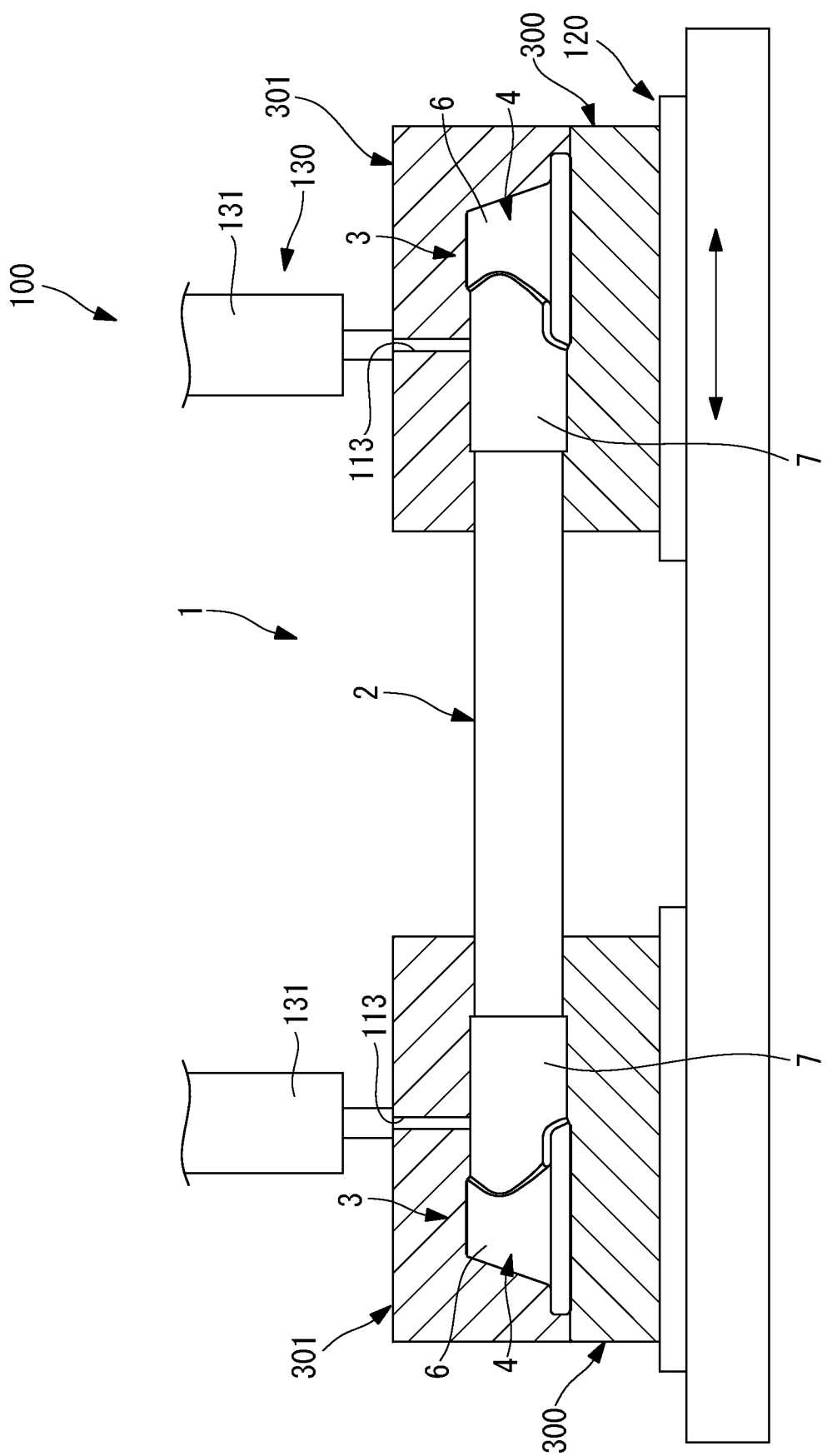
FIG. 8 is an entire structure diagram illustrating a manufacturing apparatus for a robot arm according to one embodiment of the present invention.

As illustrated in FIG. 8, the manufacturing apparatus 100 according to the present embodiment includes: two fixing parts each including a material filling space housing the attachment interface part 3 in a state where the connection part main body 6 of the attachment interface part 3 and an end of the arm main body 2, which are manufactured in different steps, are disposed apart from each other; a slide mechanism 120 that moves linearly one fixing part relative to the other fixing part in a longitudinal-axis direction of the arm main body 2; and the material injection part 130. The two fixing parts have the same shape and are disposed so that openings of the material filling space where the arm main body 2 is fitted face each other. Each fixing part has a fitting structure including a support members 300 and a fastening member 301 as a pair as illustrated in FIG. 8. The two attachment interface parts 3 have the same shape.

The end of the arm main body 2 and the connection part main body 6 of the attachment interface part 3 are housed with a distance therebetween in the material filling space of the fixing part, and the attachment surfaces 5a of the two metal plates 5 of the attachment interface parts 3 at the both ends of the arm main body 2 are positioned so as to be disposed in the same plane, and moreover the material filling space for injecting the resin (molten material) for forming the joint part 7 is formed in the sealed state.

The material injection part 130 includes two molding machines 131 each connected to a gate 113 that opens to the material filling space of each of the two fixing parts. By the molding machine 131, the molten resin can be injected into the material filling space through the gate 113. As the resin injected into the material filling space is cured, the joint part 7 that joints the resin of the arm main body 2 and the resin of the connection part main body 6 of the attachment interface part 3 is formed and thus, the arm main body 2 and the attachment interface part 3 can be integrally jointed.

Figure 9:
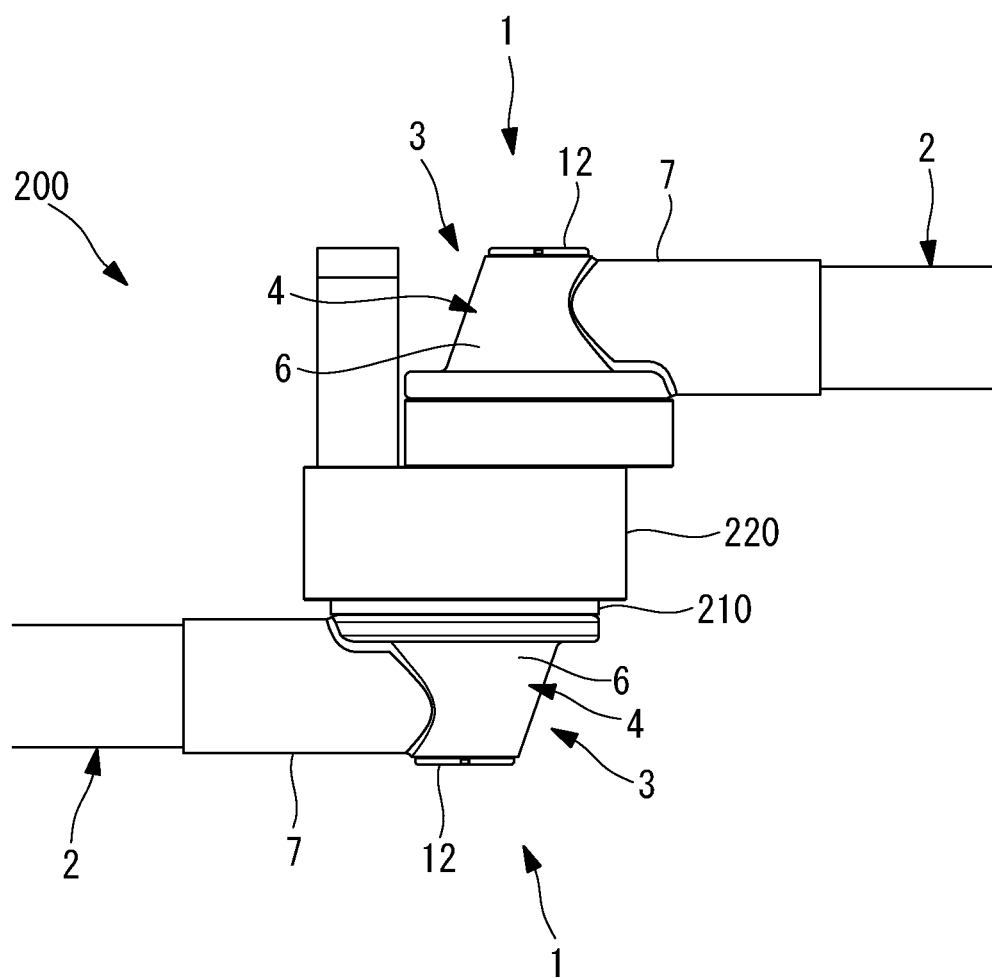
FIG. 9 is a front view illustrating a joint shaft part of a robot to which the robot arm of FIG. 1 is assembled to a speed reducer.
Figure 10:
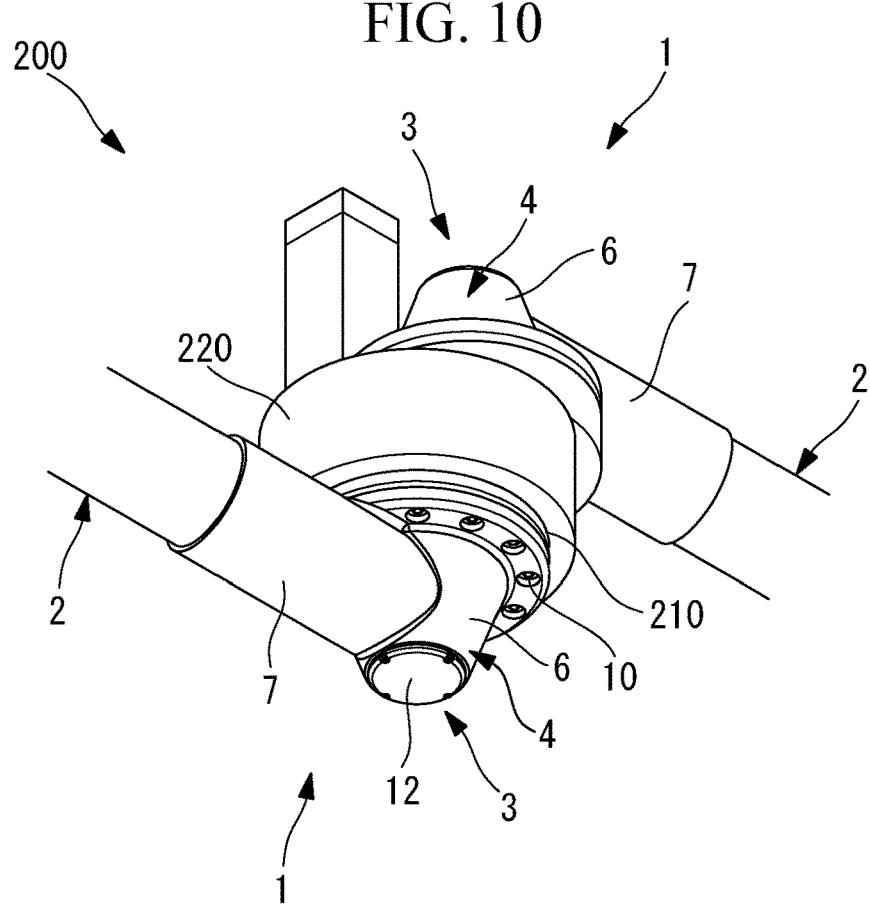
FIG. 10 is a perspective view illustrating the joint shaft part of FIG. 9.

As illustrated in FIG. 9 and FIG. 10, the robot arm 1 manufactured in this manner is fixed to a speed reducer output shaft 210 of the robot 200, for example, so that a joint shaft of the robot 200 can be formed easily.

In this case, the attachment screw 10 is penetrated into the penetration hole 9 provided to the metal plate 5 so as to be fastened to the screw hole of the speed reducer output shaft 210; thus, the head part of the attachment screw 10 can be pressed to the seat surface, that is, the surface of the metal plate 5 opposite to the attachment surface 5a.

That is to say, if the resin exists between the head part of the attachment screw 10 and the speed reducer output shaft 210, sufficient fastening may fail. In this case, as the robot 200 is repeatedly operated, the attachment screw 10 may be loosened. In the present embodiment, however, only the metal plate 5 is disposed between the head part of the attachment screw 10 and the speed reducer output shaft 210; therefore, the fastening with sufficient fastening power is possible and the loosening of the attachment screw 10 can be prevented for sure, which is advantageous.

Figure 11:
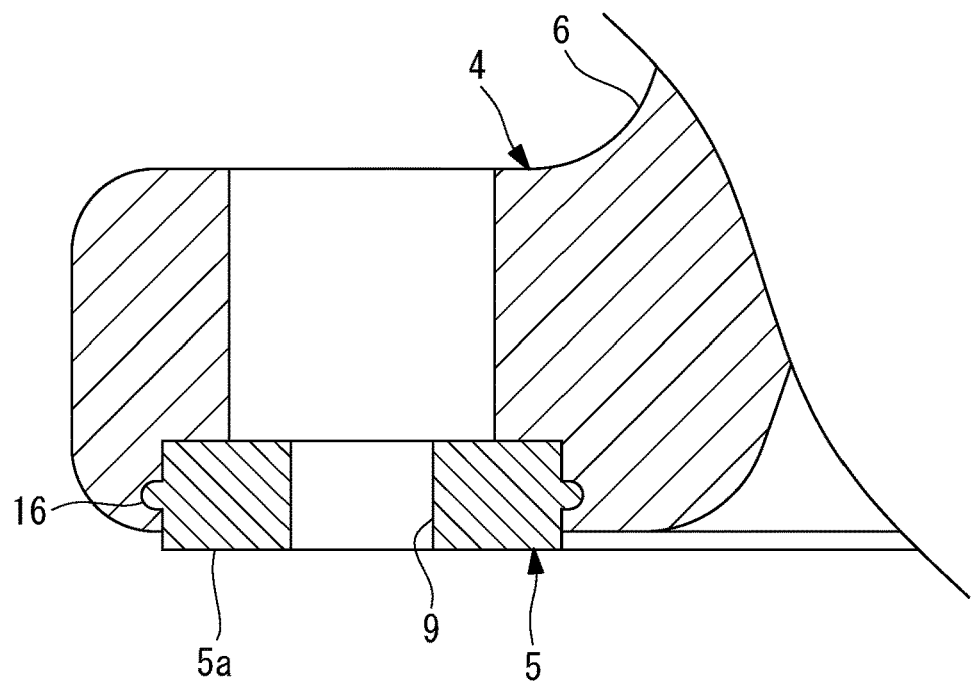
FIG. 11 is a magnified longitudinal cross-sectional view illustrating a part A of FIG. 7.

Note that it should be very careful so that the metal plate 5 will not be separated from the resin member of the connection part 4 due to load. In consideration of this, the side surface of the metal plate 5 preferably has a convex part 16 that projects radially at a position at a distance from the attachment surface 5a in the thickness direction as illustrated in FIG. 11. Thus, the metal plate 5 is formed so that a lateral cross-sectional shape is concavoconvex in a longitudinal direction; therefore, the convex part 16 is caught by the connection part 4. By this structure, the metal plate 5 will not be separated unless the resin member of the connection part 4 is broken.

Figure 12:
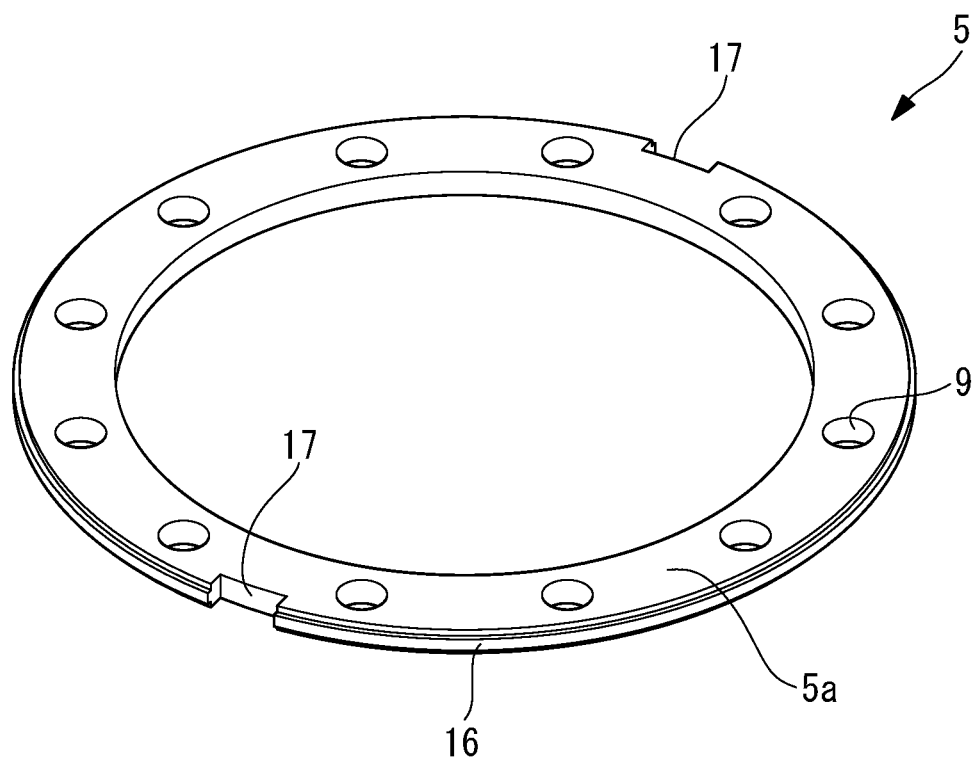
FIG. 12 is a perspective view illustrating a modification of a metal plate of FIG. 11.

The metal plate 5 includes the convex part 16 in the above example; however, instead of this structure, the side surface of the metal plate 5 may include a concave part 17 that is depressed radially at a midway position in the thickness direction. As illustrated in FIG. 12, the concave part 17 that is depressed radially may be provided at one or more positions in a circumferential direction. Thus, even if the torque acts on the metal plate 5, the displacement from the resin of the connection part main body 6 of the connection part 4 can be prevented. For further increase in strength and toughness, an adhesive for structure may be used additionally.

The arm main body 2 has the cylindrical shape; however, instead of this shape, the arm main body 2 may have any other tubular shape with an arbitrary lateral cross-sectional shape that is uniform along a longitudinal-axis direction, such as a polygonal tubular shape or an elliptical tubular shape. Furthermore, the arm main body 2 with a hollow tubular shape may be replaced by the arm main body 2 with a columnar shape with an arbitrary lateral cross-sectional shape, such as a circular columnar shape, an elliptical columnar shape, or a polygonal columnar shape.

Figure 13:
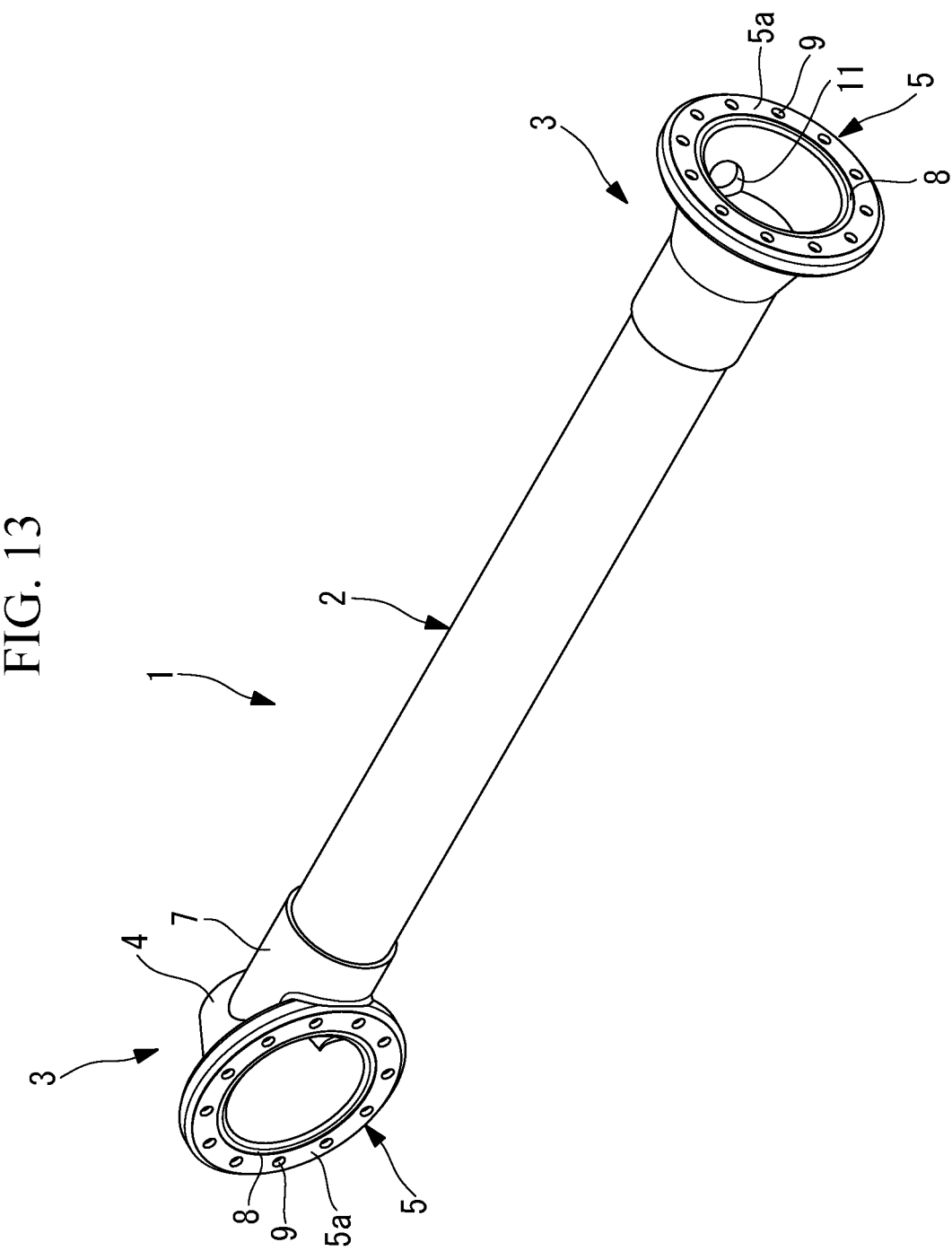
FIG. 13 is a perspective view illustrating a modification of the robot arm of FIG. 1.
Figure 14:
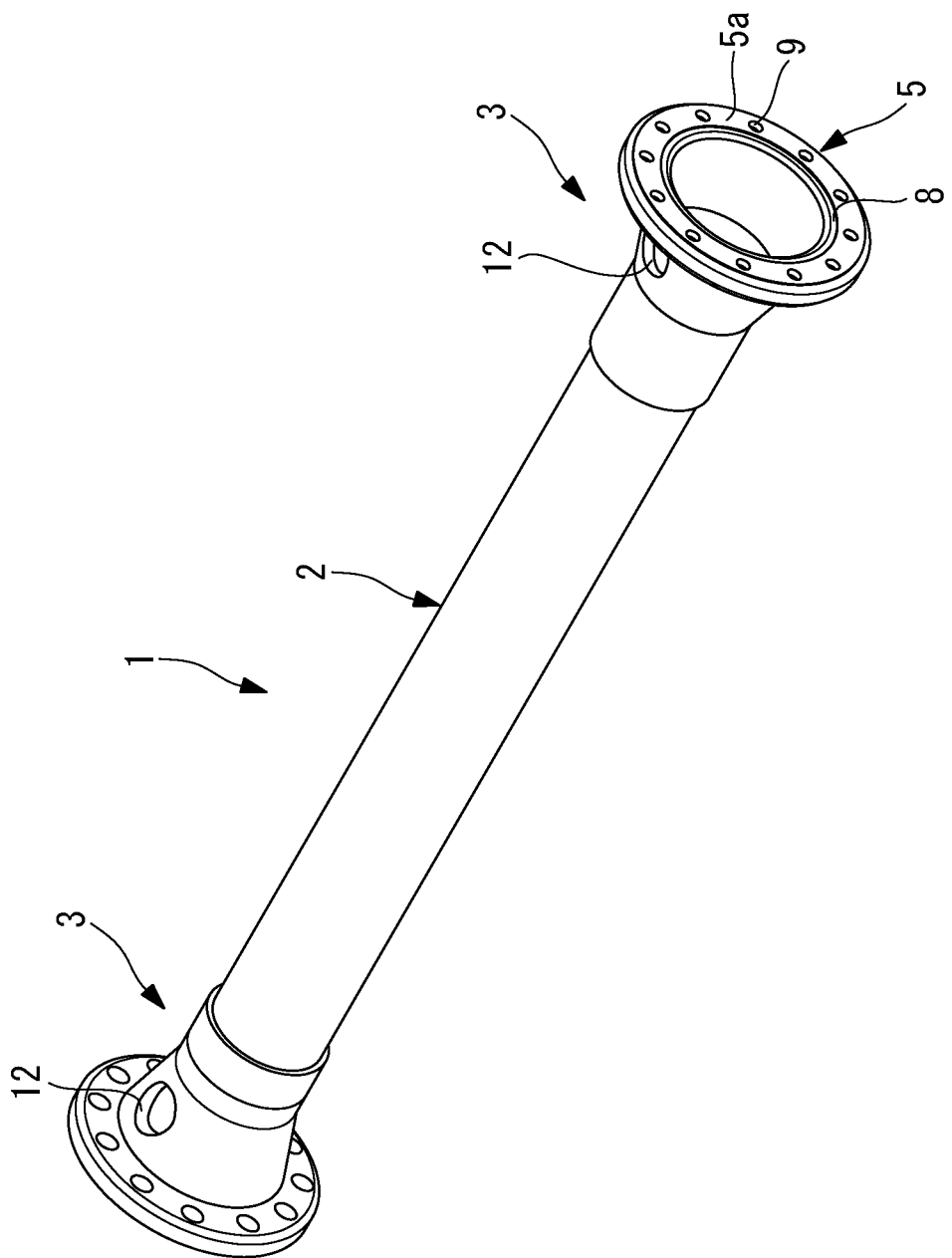
FIG. 14 is a perspective view illustrating another modification of the robot arm of FIG. 1.

In addition, the attachment interface part 3 that curves the inner hole 2a of the arm main body 2 in the orthogonal direction is provided at each end of the arm main body 2;

however, instead of this, the attachment interface part 3 may include the attachment surface 5a that is extended in the direction orthogonal to the longitudinal axis of the arm main body 2 so that the inner hole 2a of the arm main body 2 opens to the longitudinal-axis direction as illustrated in FIG. 13 and FIG. 14.

In the present embodiment, the molten material is the resin; however, metal may be used alternatively.

In the present embodiment, the arm main body 2 and the attachment interface part 3 are formed of the resin; however, at least one of the arm main body 2 and the attachment interface part 3 may be formed of metal.

In the present embodiment, the fixing part may be formed of metal, resin, or sand.

In the present embodiment, after the attachment interface 3 and the arm main body 2 are housed in the material filling space, the joint part 7 that joints integrally the end of the arm main body 2 and the connection part main body 6 of the attachment interface part 3 is formed by the resin that is injected into the material filling space of the fixing part; however, the present invention is not limited to this structure. Specifically, a part of the joint part 7 of the attachment interface part 3 may be formed before the attachment interface 3 and the arm main body 2 are housed in the material filling space, and after the attachment interface 3 and the arm main body 2 are housed in the material filling space of the fixing part, the part of the joint part 7 and the arm main body 2, which have been already formed, may be integrally jointed by injecting the molten resin into the material filling space and curing the resin.

From the above-described embodiment, the following invention is derived.

One aspect of the present invention is a manufacturing apparatus for a robot arm including an arm main body with a long tubular or columnar shape having a uniform lateral cross-section, and attachment interface parts that are fixed to both sides of the arm main body and are attached to another member, the manufacturing apparatus including: a pair of fixing parts supporting at least a part of each of the attachment interface parts and each end of the arm main body in a positioned state and each including a material filling space at least near a joint part between each of the attachment interface parts and the arm main body; a slide mechanism capable of adjusting a distance between the two fixing parts along a longitudinal axis of the arm main body by moving at least one of the fixing parts; and a material injection part that injects a molten material into the material filling space so as to joint each of the attachment interface parts to each end of the arm main body.

According to this aspect, by the pair of fixing parts that are properly spaced apart with the operation of the slide mechanism, the two attachment interface parts can be supported in the positioned state at both ends of the arm main body and the material filling space is formed near the joint part between the arm main body and each of the attachment interface parts. By the operation of the material injection part, the molten material is injected into the material filling space and thus, the robot arm with the attachment interface part jointed at each end of the arm main body is manufactured.

In this case, when the robot arms with different lengths are manufactured, the slide mechanism is operated to adjust the distance between the pair of fixing parts. Since the arm main body has the tubular or columnar shape with the uniform lateral cross-section, just moving at least one of the pair of fixing parts in the direction along the longitudinal axis of the arm main body enables the material filling space to be disposed near the joint part between the end of the arm main body and each of the attachment interface parts for the arm main bodies with various lengths. Thus, the plurality of kinds of robot arms that are different only in length can be manufactured easily.

Another aspect of the present invention is a manufacturing apparatus for a robot arm including an arm main body with a long tubular or columnar shape having a uniform lateral cross-section, and attachment interface parts that are fixed to both sides of the arm main body and are attached to another member, the manufacturing apparatus including: a pair of fixing parts each including a material filling space for molding each of the attachment interface parts and capable of supporting each end of the arm main body in a positioned state at a position of blocking the material filling space; a slide mechanism capable of adjusting a distance between the two fixing parts by moving at least one of the fixing parts; and a material injection part that injects a molten material into the material filling space so as to mold each of the attachment interface parts and joint each end of the arm main body to each of the molded attachment interface parts.

According to this aspect, as the both ends of the arm main body are supported by the pair of fixing parts that are properly spaced apart with the operation of the slide mechanism, the material filling space in each fixing part is blocked by the end of the arm main body. As the molten material is injected into the material filling space in this state by the operation of the material injection part, each of the attachment interface parts is molded in the material filling space and the robot arm with each of the molded attachment interface parts jointed at each end of the arm main body is manufactured.

In the case of manufacturing the robot arms with different lengths, the distance between the pair of fixing parts is controlled by operating the slide mechanism. Since the arm main body has the tubular or columnar shape having a uniform lateral cross-section, just moving at least one of the pair of fixing parts in the direction along the longitudinal axis of the arm main body makes it possible to dispose the material filling space at the position where each of the attachment interface parts can be molded at each end of the arm main body for the arm main bodies with various lengths. Thus, a plurality of kinds of robot arms that are different only in length can be manufactured easily.

In the above aspects, the arm main body and the attachment interface parts may each have an outer surface at least a part of which is formed of resin, and the molten material may be resin.

In the above aspects, the molten material may be metal. In the above aspects, the arm main body and the attachment interface parts may be formed of metal.

The invention claimed is:

1. A manufacturing apparatus for a robot arm including an arm main body with a long tubular or columnar shape having a uniform lateral cross-section, and attachment interface parts that are fixed to both sides of the arm main body and are attached to another member, the manufacturing apparatus comprising:
   a pair of fixing parts supporting at least a part of each of the attachment interface parts and each end of the arm main body in a positioned state and each including a space at least near a joint part between each of the attachment interface parts and the arm main body;
   a slide mechanism capable of adjusting a distance between the two fixing parts along a longitudinal axis of the arm main body by moving at least one of the fixing parts; and a material injection part that injects a molten material into at least a part of the space so as to integrally joint each of the attachment interface parts to each end of the arm main body, wherein a material filling space, which is filled with the molten material, of the space has:

at least part of a first end proximate the arm main body, the first end having a cross sectional shape conforming to a cross sectional shape of the arm main body; and at least a part of a second end proximate one of the attachment interface parts, the second end having a shape conforming to an outer peripheral surface of one of the attachment interface parts, and wherein the material filling space has a hollow between at least the part of the first end and at least the part of the second end.

2. A manufacturing apparatus for a robot arm including an arm main body with a long tubular or columnar shape having a uniform lateral cross-section, and attachment interface parts that are fixed to both sides of the arm main body and are attached to another member, the manufacturing apparatus comprising:

a pair of fixing parts each including a space for molding each of the attachment interface parts and capable of supporting each end of the arm main body in a positioned state at a position of blocking the space;

a slide mechanism capable of adjusting a distance between the two fixing parts by moving at least one of the fixing parts; and a material injection part that injects a molten material into at least a part of the space so as to mold each of the attachment interface parts and integrally joint each end of the arm main body to each of the molded attachment interface parts, wherein a material filling space, which is filled with the molten material, of the space has:

at least part of a first end proximate the arm main body, the first end having a cross sectional shape conforming to a cross sectional shape of the arm main body; and at least a part of a second end proximate one of the attachment interface parts, the second end having a shape conforming to an outer peripherical surface of one of the attachment interface parts, and wherein the material filling space has a hollow between at least the part of the first end and at least the part of the second end.

3. The manufacturing apparatus for a robot arm according to claim 1, wherein the arm main body and the attachment interface parts each have an outer surface at least a part of which is formed of resin, and the molten material is resin.

4. The manufacturing apparatus for a robot arm according to claim 1, wherein the molten material is metal.

5. The manufacturing apparatus for a robot arm according to claim 4, wherein the arm main body and the attachment interface parts are formed of metal.

* * * * *